United States Patent

Le Strat et al.

[15] 3,692,961

[45] Sept. 19, 1972

[54] TELEPHONE CALL SIMULATOR

[72] Inventors: Guy Jean Le Strat, Issy-Les-Moulineaux; Rene Francois, Lannion; Pierre-Louis Joseph Satie, Perros Guirec, all of France

[73] Assignee: International Standard Electric Corporation, New York, N.Y.

[22] Filed: Oct. 23, 1970

[21] Appl. No.: 83,404

[30] Foreign Application Priority Data

Nov. 26, 1969 France......................6940720

[52] U.S. Cl...........................................179/175.2 R

[51] Int. Cl...............................................H04m 3/24

[58] Field of Search.....................179/175.2 R, 175.3

[56] References Cited

UNITED STATES PATENTS 2,721,910 10/1955 Avery................179/175.2 R 2,632,817 3/1953 Kessler................179/175.2 R

*Primary Examiner*—Kathleen H. Claffy

*Assistant Examiner*—Douglas W. Olms

*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

Equipment is provided for the simulation of telephone calls on special test lines connected to a telephone exchange in order to check the proper routing of calls by the exchange under test. Operations are simulated and checked by connecting special test circuits to the test lines. Working characteristics of each test line are stored in a memory unit. A small computer processes all these memory units through fast exploration cycles and simultaneously a distributor-device controls operations of each test circuit on its associated test line and a testing device records corresponding signals in the exchange.

12 Claims, 2 Drawing Figures

Inventor
G.J. LE STRAT - R. FRANCOIS -
P.L.J. SATIE

By D.P. Warner
Attorney

TELEPHONE CALL SIMULATOR

BACKGROUND OF THE INVENTION

The present invention relates to the simulation of telephone calls and concerns an arrangement for checking the operation of an automatic telephone exchange by simulating the calls of subscribers.

SUMMARY OF THE INVENTION

In devices of this kind, test lines are used to which available directory numbers are allotted and which are connected to the main distributing frame of the exchange in the manner of subscribers' lines. Each test call engages a pair of coupled test lines, one functioning as a calling line (A) and the other functioning as a called line (R). The test call may include a set of phases in which the device proceeds, either to operations which simulate the manipulations that a subscriber carries out at his station, or to verifications which detect the effects by which the normal operation of the exchange is manifested in subscribers' stations. In the usual systems, these effects are the ringing current on the called line and different tones (dial tone, ringing tone, busy tone etc.) Thus a test call may include the following phases (it will be supposed, in this example, the replacement of the hand set at one station causes the sending of busy tone to the other):

| Phase | Calling test line (A) | Called test line (R) |
|---|---|---|
| 1. | Loop operation (call) | |
| 2. | Verification of dial tone | |
| 3. | Dialling operation | |
| 4. | | Verification of ringing |
| 5. | Verification of the return of ringing | |
| 6. | | Looping operation (reply) |
| 7. | | Verification of the cessation of ringing |
| 8. | | Operation of sending a voice frequency VF (conversation) |
| 9. | Verification of the sending of the voice frequency VF | |
| 10 | | Operation of stoppage of the VF |
| 11 | Operation of cut off (replacement of hand set) | |
| 12 | | Verification of the busy tone |
| 13 | | Operation of cut off (replacement of hand set) |
| 14 | Metering | Metering |

It will be remarked that verifying the ringing on the called line, there is above all verified that the exchange has properly established the connection path towards the line the directory number of which has been sent.

It is well understood, that this example of a call, which simulates the normal development of a call, is not limiting. Test calls can also be made which simulate special conditions, such as a call which is addressed to a busy line etc.

Test calls are practiced for a long time as a simple means of controlling the operation of the exchange. In order that the control may be more effective, simultaneous calls are made, this term covering calls which develop during the same time, even if they do not commence at the same moment and are found in different phases. An arrangement which allows of making simultaneous calls is described, for example, in the French Pat. No. 1,273,458. However, known arrangements do not allow of making more than a small number of simultaneous calls of the order of about 10.

SUMMARY OF THE INVENTION

The invention has for its object a test arrangement which allows, the making of simultaneous test calls in greater number than heretofore. For example, a device is disclosed which comprises 100 test lines and allows of making up to 50 simultaneous calls to be made; and which allows wide variations in the test lines which are connected up for test calls. The exchange is thus led to establish relatively numerous and very diverse connection paths, in such a way that the control of its operation becomes very effective. The invention has also for its object a test arrangement of so little bulk that it can constitute a mobile unit which can be used temporarily in one exchange or another. This allows the installation of several of these mobile units in an exchange in the course of installation in order to control its operation, before it is cut over, in traffic conditions sufficiently near to the traffic envisaged.

The simulator of calls according to the invention comprises, apart from a series of test lines suitably equipped, (1.) separate test circuits (such as dials and generators and detectors of tones) which are associated with the test lines to be connected separately to these lines in the successive phases of a test call; (2.) a cyclic distributor allowing the connection of these circuits to the successive test lines to be selectively controlled; (3.) a cyclic tester allowing the detector circuits which can be connected to the same lines to be tested; and (4.) a data processing apparatus. The data processing apparatus is programmed and includes: (1) a direct access electronic memory, comprising a series of cells assigned in a fixed manner to the test lines and placed in the same order, each cell containing the directory number of its line and being able to receive, for each test call, relative information (calling function A or called function R and address of the cell assigned to the other connected line) and in the course of each call, situation information (phase of the call, duration of the phase etc.); (2) a cyclic explorer (or scanner) allowing the successive cells of this memory to be explored at the same time as the corresponding test lines are reached by the distributor or the tester; (3) a treatment and control circuit fit for treating the information being found in the cells explored and the indications of the tester concerning the corresponding test lines, for sending to the distributor orders for the operation of the appropriate test circuits on the same lines and for writing new situation information in the cells explored and in the connected cells; (4) choosing means allowing different free test lines to be chosen in view of new test calls and relation information to be written in the corresponding cells; and (5) sorting means to engage test calls on lines the cells of which have received relation information.

According to another characteristic of the invention the said choosing means explore the free memory cells and carry out the choosing operations on these cells, in such a manner that no material connection is necessary between this means and the test lines themselves. Thus the choosing means can constitute an interior part of the information treatment assembly. The free cells are cells the lines of which have been freed after a test call and which have themselves been emptied of information relating to this test call.

According to another characteristic of the invention, the operation of the said choosing means is controlled by a call device which itself operates when the free cells (or the free test lines) are in sufficient number. In practice, it can be considered that the presence of three free cells (or lines) is a condition of operation for the choosing means and allows of a sufficient variety of coupled lines to be obtained.

According to a variant of the invention, the said choosing means constitute a separate circuit, in particular a wired logic circuit, operating on a field of points connected to the cells in order to be marked by the free cells, and writing the pairs of designated cells in a designation memory cell to which the treatment circuit is referred lastly to write the relation information in the designated cells.

According to another variant of the invention, the said choosing means forms part of the treatment circuit and is served by appropriate information means concerning the free cells. As in the previous variant, the designated pairs of cells are written in a designation memory cell to which the treatment circuit is lastly referred to write the relation information in the designated cells. In this variant, the said information means can be made up of a field of points marked by the treatment circuit itself when this circuit frees the cells.

According to another characteristic of the invention, the said designation cell forms part of the memory which comprises the cells assigned to the test lines, and its exploration forms part of the exploration cycle of this memory, the relation information being transferred from the designation cell to the designated cells when the exploration reaches the said designation cell.

According to another characteristic of the invention, the new relation information is written in the designated cells with a start information such as "Phase 1," in such a manner that the new test calls are engaged as soon as the cells are reached by the exploration. In particular, when the phase 1 consists in looping the calling line (A), a test call is engaged as soon as the cell which contains the information "A — Phase 1" is reached by the exploration. This very simple means allow of new test calls being engaged without any delay and of proceeding thus to successive test calls at a rate as rapid as possible.

According to another characteristic of the invention, the separate test circuits are associated in common with groups of test lines to be connected to each line in appropriate phases of the test calls, and they are associated with means for marking availability or busy to which the treatment circuit refers before controlling the connection of these circuits to the test lines. Preferably, the said means of marking is made up of a field of points marked by the treatment circuit itself when this circuit connects or disconnects the said test circuit.

BRIEF DESCRIPTION OF THE DRAWINGS

Other characteristics and advantages of the invention will appear in the description which follows with reference to the annexed drawings, in which.

DESCRIPTION OF PREFERRED EMBODIMENTS

Figure 1:
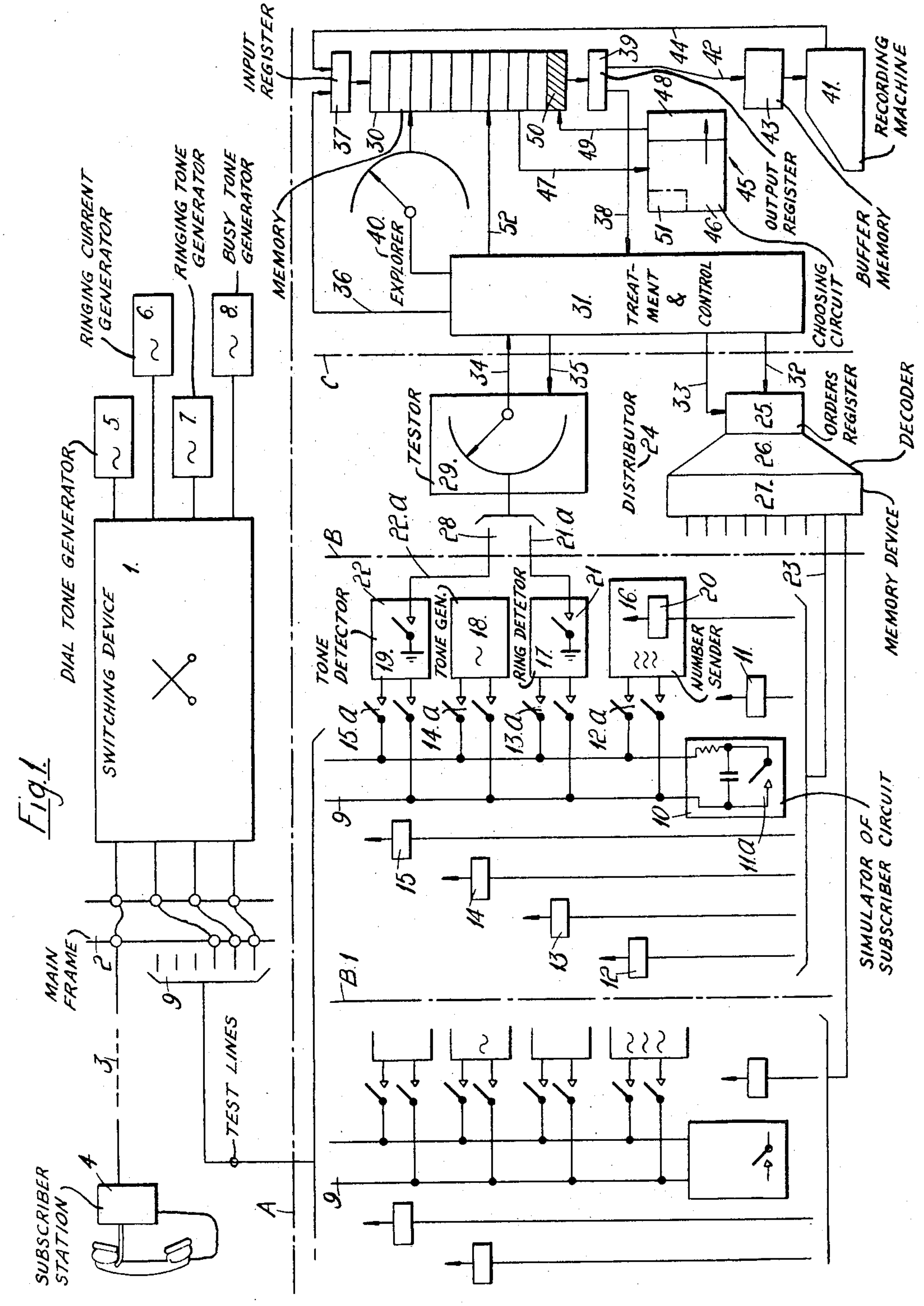
FIG. 1 shows the general schematic of one embodiment of the invention, comprising test circuits associated with each line and a separate choosing circuit.

In FIG. 1 the telephone exchange, the operation of which is to be controlled, is succinctly shown above the dot-dash line A, and the call simulator according to the invention, is shown below this line. In this simulator, the test lines are shown, with their equipment (which comprises test circuits in this embodiment) to the left of the dot-dash line B. The complete equipment of a test line is shown between the dot-dash lines B and B1. The data processing apparatus is shown to the right of the dot-dash line C. The distributor and the tester, which ensure the connection between the treatment assembly and the test lines, are shown between the dot-dash lines B and C.

The telephone exchange comprises a switching device 1, a main frame 2, to which are connected the lines 3 towards the subscribers' stations 4, and various signal generators such as a generator of dial tone 5, a ringing current generator 6, a generator of ringing tone 7 and a generator of busy tone 8. The exchange can be of any system whatever and this schematic is not limited as concerns the kinds of tones or signalling currents which are provided to be sent either to the calling line or to the called line.

The test lines are connected to the main frame 2 like the subscribers' lines 3, within the limits of the available places on the frame. Each test line receives a directory number (within the limits of the numbers available in the exchange), in such a manner that it can be reached by the normal operation of the exchange when it is engaged in a test call as a called line.

Each test line is provided with a complete equipment that allows it to operate as a calling line (A) or as a called line (R) in a test call. It carries first, in fixed manner, an impedance circuit 10 which simulates a subscriber circuit and which contains a contact (or set of contacts) 11 *a* which simulates the set of hook or cradle contacts in a subscriber station. This contact is operated by a relay coil 11. Particular test circuits can be branched on the line 9 by means of pairs of contacts 12*a*, 13*a*, 14*a*, 15*a*, actuated by relay coils 12, 13, 14, 15. These test circuits principally comprise a number sender 16 (which is supposed of the type of voice frequency combinations, for a pushbutton set), a ringing current detector 17, a conversation tone generator 18 and a tone detector 19, capable of detecting mainly the tones of dialling, of ringing, of conversation and of busy. The number sender 16 contains a group of sender relays such as 20, which allow of frequency combinations which define the digits of a wanted number to be sent. The detector circuits such as 17 and 19 are provided with means such as contacts 21, 22, to signal that the expected tone or current has been detected by marking the test wires 21*a*, 22*a*.

The wires which cause the relays 11 to 15 and 20 to operate form a control bundle 23 associated with each test line. All the control bundles are carried by the corresponding outputs of the distributor 24. The distributor 24 comprises an orders register 25 connected to the treatment assembly for coded connection orders and the addresses of the successive test lines for which these orders are intended. The orders register 25 is followed by a decoder 26 and a memory device 27 in which the groups of memory apparatus such as flip-flops are assigned to each test line. These memory apparatus ensure the operation of the relays associated with the test lines and hold these relays during the desired time, even though the distributor only stops on each line for a very short moment. The decoder 26 translates the coded orders and addresses in such a way as to operate the desired memory apparatus in the groups associated with the desired lines.

The test wires 21*a*, 22*a* of the detector circuits form a test bundle 28 associated with each test line. All the test bundles are connected to the respective inputs of a tester, or scanner, 29 that the treatment and control assembly 31 addresses to the same test lines as the distributor 24.

The data processing apparatus essentially comprises a memory 30 in which a cell is assigned in fixed manner to each test line and a treatment and control circuit 31. This circuit 31 is connected to the input of the distributor 24 by a bundle 32 for orders and by a bundle (or the wire) 34 to receive the detection signals and by a bundle 35 for the addresses. The circuit 31 is connected to the memory 30 by a writing bundle 36 connected to the input register 37 of the memory and by a reading bundle 38 connected to the output register 39. An explorer, or scanner, 40 directs the treatment circuit 31 to the successive cells, which are placed in the memory 30 in the same order as the respective test lines.

The distributor 24, the tester 29 and the explorer 40 have a cyclic continuous operation, and at each moment of the cycle, the treatment and control circuit 31 is found connected to a test line by the distributor and the tester and to the corresponding memory cell by the explorer. The period of the exploration cycle can be, mainly, about 4 mS in such a way that, in a test distributor which comprises 100 test lines, each line, with its cell is treated in about 40 mS.

The memory 30 is connected, moreover, to a recording machine 41, which can be a printing machine or a magnetic tape machine, etc. The output register 39 is connected to this machine by a bundle 42 in passing by a buffer memory 43. The machine 41 can also be connected, as usual, to the input register 37 by a bundle 44, but this connection is not used in the operation of the device according to the invention.

The data processing apparatus described above can be constituted by a conventional calculator, suitably programmed with a registered programme.

In the embodiment form shown in FIG. 1, this apparatus is completed by a choosing circuit 45 the function of which is to choose pairs of free test lines to designate each time a calling line (A) and a called line (R) with a view to a new test call. The choosing circuit shown in FIG. 1 comprises a call choosing circuit 46, which is connected to the memory cells by a bundle 47 which marks the free cells on a points field. The choice of a point A and of a point R in a series of marked points can be made by means of a wired circuit of the kind used in priority chains. The two points chosen are marked at the input of a coder 48 in which the analogue identity of these points is translated into coded addresses of the two designated cells. The two addresses are transferred by a bundle 49 to a designation cell 50 placed in a queue of the line cells in the memory 30. In order that two cells freed after a test call may not be retaken immediately for a new call, the operation of the choosing circuit 46 depends on a circuit 51 which detects the presence of a sufficient number of free cells. In practice, it is sufficient to subordinate the operation of the choosing circuit to the presence of at least three free cells. The designation cell will be explored in its turn in the exploration cycles carried out by the treatment circuit 31 by means of the explorer 40.

Each line cell is able to contain the following information :

- the directory number assigned to the associated test line (this number remains written in the cell so long as the number of the line is not changed),
- the relation informations: function A (calling line) or function R (called line) and address of the cell of the line which is coupled in a test call (this information written in the case of each test call),
- situation information : successive phases of a test call and possible divisions of these phases (this information is modified in the course of a test call) and
- different informations of duration and of repetition used in certain phases of a test call (this information is expressed in number of exploration cycles or in number of repetitions and then deducted up to zero or until the expected effect be shown).

The control and treatment circuit 31 carries out all the necessary operations, usual in calculators : coordinated direction of the explorer 40 of the tester 29 and of the distributor 24, reading of the information contained in the memory cells 30, reference to the indications of the tester, treatment of this information according to a determined programme, writing of new information in these cells and sending of orders towards the distributor for the control of the relays associated with the test lines. The designation cell 50 is treated according to a special programme which will be explained later.

The operation of the device of FIG. 1 in a test call comprising the phases set out above will now be described. A pair of cells coupled for this test call will be considered, in which the initial information (relation information and information of start "Phase 1") has already been written.

PHASE 1 — LOOPING OF THE CALLING LINE (A)

When the explorer 40 reaches the cell containing the initial information "A — Phase 1," the treatment circuit 31 sends to the distributor 24 the order to close the contact "hook" 11*a* in the terminal circuit 10 of the corresponding test line. The distributor decodes this order, directs it to the section of the memory 27 which is associated with this line and puts to work, in this section, the flip-flop which controls the relay 11. No duration beyond the moment of exploration is necessary for this operation. The treatment circuit writes the information "Phase 2" in the cell considered and passes to the next cell. The relay 11 operates in the 4 mS. of an exploration cycle and closes the contact 11*a*, which simulates the taking off the hook of the station in the case of a call.

PHASE 2 — RECEIPT OF THE DIALLING TONE

When the explorer again reaches the cell considered, which now contains the information "A — Phase 2," the treatment circuit sends to the distributor the order to connect the detector circuit 19. The distributor causes to operate the flip-flop which controls the connection relay 15 associated with the line "A" considered. The treatment circuit writes, in the cell "A" considered the information "Phase 2.1" with the maximum duration foreseen for waiting for the dialling tone. This duration is expressed in the number of passages of the explorer over this cell. It should cover the time that the exchange can take, in the limits of its normal operation, to present a register to the calling line. No duration is necessary for the operations of phase 2, and the treatment circuit passes to the next cell.

PHASE 2.1 — WAITING FOR THE DIALLING TONE

Each time that the explorer reaches anew the cell considered, which now contains the information "A — Phase 2.1," the treatment circuit deducts one unit from the duration which is written in this cell and refers it to the tester. So far as the tester does not signal that the circuit 19 has detected the dialling tone, the treatment circuit passes without more to the next cell.

When the tester at least indicates that this tone has been detected, the treatment circuit sends to the distributor the order to disconnect the detector circuit 19. According to the address of the coupled cell "R," which is found in the cell "A," the treatment circuit is directed to this cell "R" and writes therein the information "Phase 3.1." It writes the information "Phase 3" in the cell "A" and passes to the next cell.

PHASE 3 ETC. — SENDING OF THE WANTED NUMBER

The number of the wanted test line "R," which should be sent by the line "A" is written in the cell "R." In the successive divisions of phase 3, the successive digits of this number will be transferred one by one to the cell "A" to be sent by the line "A." In the example described here, the digits will be transferred when the explorer reaches the cell "R," and they will be sent when the explorer will reach the cell "A."

PHASE 3.1 — TRANSFER OF THE FIRST DIGIT

When the explorer reaches the cell "R," which now contains the information "Phase 3.1," the treatment circuit transfers the first digit of the directory number of the test line "R" to the cell "A." It writes the information "Phase 3.1.1" in the two cells and passes to the next cell.

PHASE 3.1.1 — SENDING OF THE FIRST DIGIT

When the explorer again reaches the cell "A", which now contains the information "Phase 3.1.1" and the first digit of the wanted number, the treatment circuit sends to the distributor the order to connect the number sending circuit 16 (by means of the relay 12) and sets it to work out the frequency combination 20 which defines the first digit of the number. It writes the information "Phase 3.1.2" with the desired duration of the sending of the combination of frequencies, expressed in number of cycles of exploration, in the cell "A." For example, when the duration of sending should be 20 mS. and the period of the cycle is 4mS. the number "5" will be written. The treatment circuit then passes to the next cell.

PHASE 3.1.2 — TIME OF SENDING THE FIRST DIGIT

Each time that the explorer reaches anew the cell "A," the treatment circuit deducts one unit from the duration written in this cell and passes to the next cell.

When the treatment circuit at last finds, in this cell, the information "Phase 3.1.2 — duration 0," it sends to the distributor the order to release the frequency relays 20 and writes the information "Phase 3.2" in the two cells "A" and "R," then it passes to the next cell.

PHASE 3.2 — TRANSFER OF THE SECOND DIGIT

When the explorer reaches the cell "R" which now contains the information "Phase 3.2," the treatment circuit transfers the second digit of the number of the test line "R" to the cell "A," writes the information "3.2.1"b in the two cells and passes to the next cell.

PHASE 3.2.1 — SENDING OF THE SECOND DIGIT

When the explorer again reaches the cell "A," which now contains the information "Phase 3.2.1" and the second digit of the wanted number, the treatment circuit sends to the distributor the order to work out the corresponding combination of the relays 20, writes in the cell "A" the information "Phase 3.2.2" and the duration of sending and passes to the next cell.

CONTINUATION OF PHASE 3

The sending of the successive digits proceeds in the same manner : transfer in the phase 3.*x*, sending in the phase 3.*x*.1 and duration of the sending in the phase 3.*x*.2. When at last the duration of sending of the last digit "n" has been deducted up to zero in the phase 3.*n*.2, the treatment circuit releases the delays 20 and the connection relay 12, writes the information "Phase 4" in the two cells "A" and "R" and passes to the next cell.

PHASE 4 — RECEPTION OF RINGING

The reception of the ringing current is verified on the test line "R." When the explorer reaches the cell "R," which now contains the information "Phase 4," the treatment circuit causes the ringing detector circuit 17 to be connected and writes in this cell "R" the information "Phase 4.1" with the duration provided for waiting for ringing. This duration should cover the time which the exchange can take, within the limits of its normal operation, to establish a connection path towards the test line "R." The treatment circuit then passes to the next cell.

PHASE 4.1 — WAITING FOR RINGING

Each time that the explorer anew reaches the cell "R," the treatment circuit deducts one unit from the duration which is written in this cell and refers it to the tester. So far as the tester does not signal that the circuit 17 has detected the ringing current, the treatment circuit passes without more to the next cell.

When the tester at least indicates that the ringing current has been detected, the treatment circuit causes the circuit 17 to be disconnected, writes the information "Phase 5" in the two cells "R" and "A" and passes to the next cell.

PHASE 5 — RECEIPT OF THE RINGING TONE

When the explorer reaches the cell "A," which now contains the information "Phase 5," it causes the circuit 19 to be connected anew to detect the ringing tone on the calling line. This tone should be sent by the exchange at the same time as the ringing current, but a small delay can be allotted to this operation. The treatment circuit then writes in the cell "A," the information "Phase 5.1" with the allocated duration of waiting, and passes to the next cell.

PHASE 5.1 — WAITING FOR THE RINGING TONE

As in the waiting Phases 2.1 and 4.1, each time that the explorer again passes the cell "A," the treatment circuit deducts one unit from the written duration and refers to the tester. So far as the tester does not signal that the circuit 19 has detected the ringing tone, the treatment circuit passes without more to the next cell. When the tester at last indicates that the ringing tone has been detected, the treatment circuit causes the circuit 19 to be disconnected, writes the information "Phase 6" in the two cells "A" and "R" and passes to the next cell.

PHASE 6 — LOOPING OF THE CALLED LINE (R)

When the explorer now reaches the cell "R," which contains the information "Phase 6," the treatment circuit 31 sends to the distributor the order to operate the relay "hook" 11 associated with the test line R to simulate the unhooking by the subscriber who responds to a call. The ringing ought to stop immediately after the unhooking, but a small delay can be assigned to this operation as at the sending of the ringing tone in phase 5. The treatment circuit then writes, in the cell "R," the information "Phase 7" with the allowed duration of the delay.

PHASE 7 — DELAY OF STOPPING THE RINGING

The treatment circuit now deducts one unit from the duration written in this phase 7 each time that the explorer reaches anew the cell "R." When the treatment circuit at last finds, in this cell "R," the information "Phase 7 — duration 0," it causes the detector circuit 17 to be disconnected from the test line "R" and writes in the same cell the maximum duration foreseen for verifying the stopping of the ringing. As this operation in the test device can be produced between two bursts of ringing current, the duration foreseen ought to cover the maximum dead time which can be produced in the normal operation of the exchange between two bursts of ringing current. The new information "Phase 7.1" is written at the same time in the cell "R," and the treatment circuit passes to the next cell.

PHASE 7.1 — DELAY FOR THE RENEWAL OF RINGING

The treatment circuit now deducts one unit from the duration written in this phase 7.1 each time that the explorer reaches anew the cell "R", referring each time to the tester. When the treatment circuit at last finds, in this cell "R," the information "Phase 7.1 — duration 0" without the tester having signalled the renewal of the ringing current, the treatment circuit causes the detector circuit 17 to be disconnected, writes the information "Phase 8" in the same cell "R" and passes to the next cell.

PHASE 8 — SENDING OF A CONVERSATION VOICE FREQUENCY

To verify the continuity of the connection path established in the exchange between the test lines "A" and "R" with respect to conversion currents, there is going to be sent a suitable voice frequency on the test line "R" and this frequency is going to be detected on the test line "A."

When the explorer again reached the cell "R," which now contains the information "Phase 8," the treatment circuit causes the voice frequency circuit generator 18 to be connected to the test line "R" and writes the information "Phase 9" in the two cells "R" and "A." It then passes to the next cell.

PHASE 9 — RECEIPT OF THE VOICE FREQUENCY

When the explorer now reaches the cell "A," which contains the information "Phase 9," the treatment circuit causes the detector circuit 19 (or another detector circuit) to be connected to the test line "A." It writes in this cell "A" the information "Phase 9.1" with the duration foreseen for the detection of the conversation voice frequency. This duration can again be 20 mS., that is to say, 5 exploration cycles.

PHASE 9.1 — DETECTION OF THE VOICE FREQUENCY

The treatment circuit now deducts one unit from this duration each time that the explorer reaches the cell "A," referring each time to the tester. So long as the tester does not signal the voice frequency, the treatment circuit passes without more to the next cell. When the tester at last signals that the voice frequency has been detected by the circuit 19, the treatment circuit causes the circuit 19 to be disconnected from the test line "A" and writes the information "Phase 10" in the two cells "A" and "R."

PHASE 10 — STOPPING OF THE VOICE FREQUENCY

When the explorer now reaches the cell "R," which contains the information "Phase 10," the treatment circuit causes the generator circuit 18 to be disconnected from the test line "R," writes the information "Phase 11" in the two cells "R" and "A" and passes to the next cell.

PHASE 11 — HANGING UP BY THE CALLER

When the explorer now reaches the cell "A," which contains the information "Phase 11," the treatment circuit causes the hook relay 11 associated with the test line "A" to be released, writes the information "Phase 12" in the two cells "A" and "R" and passes to the next cell.

PHASE 12 — RECEIPT OF THE BUSY TONE

When the explorer now reaches the cell "R," which contains the information "Phase 12," the treatment circuit causes the detector circuit 19 to be connected to the test line "R." It writes in this cell "R" the duration foreseen for waiting and detection of the busy tone and passes to the next cell. When the busy tone presents silent spaces, the duration foreseen ought to cover a silent space of normal duration.

PHASE 12.1 — WAITING FOR THE BUSY TONE

Each time that the explorer again reaches the cell "R," which now contains the information "Phase 12.1" it deducts one unit from the duration written in this cell and refers to the tester. So long as the tester does not signal the busy tone, the treatment circuit passes without more to the next cell. When the tester signals the busy tone, the treatment circuit causes the detector circuit 19 to be disconnected from the test line "R," writes the information "Phase 13" in this cell "R" and passes to the next cell.

PHASE 13 — HANGING UP BY THE WANTED SUBSCRIBER

When the explorer again reaches this cell "R," which now contains the information "Phase 13", the treatment circuit causes the hook relay 11 associated with the test line "R" to be released to simulate the hanging up by the wanted subscriber after the calling subscriber. It writes the information "Phase 14" in the two cells "R" and "A" and passes to the next cell.

PHASE S14 — REGISTRATION OF THE FINISHED TEST CALL

There ought now to be registered on the machine 41, the finished test call on the two test lines "A" and "R" considered, and the corresponding cells ought to be freed from the information relating to this finished test call. The registration on the machine 41 is made by passing through the buffer-memory 43, but this usual detail will no longer be mentioned hereafter.

It will be noted that the registration on the machine 41 should associate the two test lines coupled in the test call considered in spite of the possible presence of other test lines reached at phase 14 in the course of the same exploration cycle.

When the explorer now reaches the cell "A," which contains the information "Phase 14," the treatment circuit first addresses itself to the coupled cell "R" according to the address of this cell "R" which it finds in the cell "A." It transfers the directory number of the line R, that it finds in the cell R to the recording machine 41, deletes from this cell "R" the relation information (function "R" and address of the cell "A") which were written therein for the test call considered and writes therein the situation information "Phase 0" which designates a free cell. Returning to the cell "A", it transfers the directory number of the test line "A" and the final situation "Phase 14" to the machine 41, writes in this cell the information "Phase 0" and passes to the next cell. The information registered will then have the form "R — No (R) — A — No (A) — Phase 14."

By the wires 47 the two freed cells signal themselves to the choosing circuit 46, which will be able to engage them in new test calls.

REGISTRATION OF OPERATION FAULTS

The first fault can be found at the end of the waiting phase 2.1, if the dial tone is not detected within the foreseen delay. The line "R" is not concerned in this fault because its number has not yet been sent to the exchange by the line "A."

When the treatment circuit comes to deduct, in the cell "A," the duration of the waiting phase 2.1 up to zero without the tester having signalled the dial tone, it disconnects the detector circuit 19, releases the hook relay 11 and writes in this cell the fault information "F.2.1."When the explorer again reaches this cell "A", the treatment circuit addresses itself first to the coupled cell "R" to delete therein the relation information and writes therein the information of a free cell "Phase 0." Returning to the cell "A," it transfers to the recording machine 41 the directory number of the test line "A" and the fault information "F.2.1." It deletes the relation information from the cell "A" and lastly writes therein the free cell information "Phase 0."

A second fault can be found at the end of the waiting phase 4.1, if the test line "R" does not receive the ringing current within the foreseen delay. This fault can be caused by the register presented to the calling line, or by the means which establish the connection path towards the called line. The two test lines are then concerned in this fault.

When the treatment circuit happens to deduct, in the cell "R," the duration of the waiting phase 4.1 up to zero without the tester having signalled the ringing current, it causes the detector circuit 17 to be disconnected and writes the fault information "F.4.1" in the two cells "R" and "A." When the explorer again reaches the cell "A," it releases the hook relay 11 of the test line "A" and writes the information "F.4.1.1" in this cell "A". When the explorer again reaches this cell "A" after a cycle, the relay 13 of the test line "R" and the relay 11 of the test line "A" have had time to release. The treatment circuit addresses itself first to the coupled cell "R" to transfer to the machine 41 the number of the line "R," to delete from this cell "R" the relation information and writes therein the information "Phase 0." Returning to the cell "A," it transfers to the machine 41 the number of the line "A" with the fault information "F.4.1" deletes from this cell "A" the relation information and writes therein the free cell information "Phase 0."

A third fault can be found at the end of the waiting phase 5.1, if the test line "A" does not receive the ringing tone, within the foreseen delay.

When the treatment circuit happens to deduct, in the cell "A," the duration of the waiting phase 5.1 up to zero without the tester having signalled the return of ringing, it causes the detector circuit 19 to be disconnected, releases the hook relay 11 of the test line "A" and writes the fault information "F.5.1" in the two cells "A" and "R." When the explorer then reaches the cell "R," the treatment circuit writes the information "F.5.1.1" "R." When the explorer again reaches this cell "R" after a cycle, the relays 11 and 15 of the test line "A" have had time to release. The treatment circuit addresses itself first to the coupled cell "A" to transfer to the machine 41 the number of the test line "A," to delete from this cell the relation information and to write therein the information "Phase C." Returning to the cell "R," it transfers to the machine 41 the number of the test line "A" with the fault information "F.5.1" deletes from this cell "R" the relation information and lastly writes therein the free cell information "Phase 0."

A fourth fault can happen in the course of the surveillance phase 7.1 if the test line "R" continues to receive ringing current, or again if it receives another burst of ringing current. Immediately the tester signals the ringing current in the course of this phase 7.1, the treatment circuit causes the detector circuit 17 to be disconnected from the line "R," releases its hook relay 11 and writes the fault information "F.7.1" in the two cells "R" and "A." When the explorer then reaches the cell "A," it releases the hook relay 11 of the test line "A" and writes the information "F.7.1.1"in this cell. The registration is then made as in the case of the fault found in phase 4.1.

A fifth fault can happen at the end of the waiting phase 9.1, if the test line "A" does not receive the voice frequency which is sent on the line "R."

When the treatment circuit comes to deduct, in the cell "A," the duration of the waiting phase 9.1 up to zero without the tester having signalled this voice frequency, it causes the detector circuit 19 to be disconnected, releases the hook relay 11 of the test line "A" and writes the fault information "F.9.1" in the two cells "A" and "R." When the explorer then reaches the cell "R," the treatment circuit causes the generator circuit 18 to be disconnected, releases the hook relay 11 associated with the line "R" and writes the information "F.9.1.1"in this cell "R." The registration is then carried out as in the case of the fault noted in the phase 5.1.

A sixth fault can be noted at the end of the phase 12.1, if the test line "R" does not receive the busy tone within the foreseen delay. The line "A" has already been released in phase 11 and is no longer concerned, but the cell "A" remains to be freed.

When the treatment circuit comes to deduct, in the cell "R," the waiting phase 12.1 up to zero without the tester having signalled the busy tone, it disconnects the detector circuit 19, releases the hook relay 11 associated with the test line "R" and then writes in this cell the fault information "F.12.1."When the explorer again reaches this cell "R," the relays 11 and 15 have had time to release. The relay 11 associated with the line "A" has been released in phase 11. The treatment circuit addresses itself first to the cell "A" to delete therefrom the relation information and writes therein the information "Phase 0." Then returning to the cell "R," it transfers to the machine 41 the number of the test line "R" with the information of phase "F.12.1," deletes the relation information from his cell "R" and writes therein the information of a free cell "Phase 0."

DESIGNATION OF THE TEST LINES

The choosing circuit 45 knows the free test lines by means, for example, of a field of points that the free cells (in phase 0) mark by means of the wires 47. When there are at least three free cells, the circuit 51 causes the properly so called choosing circuit 46 to operate. This latter can comprise, for example, two chains of the kind of priority chains, one to designate a cell "A" and another to designate a cell "R." The circuit 46 marks the corresponding output wires towards the coder 48. The coder 48 forms the code of the addresses of the two designated cells according to their rank in the said field of points and writes in the designation cell 50 the relation information "A — address A — R — Address R."

When the explorer reaches this cell 50, the treatment circuit 31 transfers the respective relation information in the two designated cells, either "A — Address R" in the cell having the address A and "R—Address A" in the cell having the address R. It inserts the start information "Phase 1" in these two cells. If there still remain at least three free lines, the choosing circuit again operates, and the relation and start information is written in another pair of cells, and so on. When there are no longer more than three free lines, the circuit 51 stops the circuit 46, and the treatment circuit starts another cycle of exploration of the cells assigned to the test lines.

NUMBER SENDING "BY DIAL"

When it is required to simulate a subscriber's station which sends the wanted number by means of a dial sender of cut-off impulses, the test device can simulate this mode of sending by cutting and re-establishing the hook contact 11*a*. In this case, the treatment circuit 31 will control each cut-off separately, by counting according to the digit to be sent, which is written in the cell "A" as in the case of the number sender with frequency combinations described above. The duration will still be counted in numbers of cycles : for example, the usual times of 40 and 60 mS. will be translated into 10 and 15 cycles having a period of 4 mS. It will be well understood that the programme of digit sending will be able to admit of durations which will go beyond these normal durations, in the manner well known in test devices intended to control the operation of registers.

Hereafter will be made precise the commencement of phase 3, which will be made to comprise sufficiently the whole of this phase.

PHASE 3.1 — TRANSFER OF THE FIRST DIGIT

When the explorer reaches the cell "R," which now contains the information "Phase 3.1," the treatment circuit transfers the first digit of the directory number of the test line R to the cell "A." For example, if the first digit is *m*, the treatment circuit can write this digit under the form of index of "Phase 3.1.*m*" in order then to deduct this digit by one unit up to zero after each impulse. It will be supposed, for simplicity, that the first digit is "2." The treatment circuit will then write the information "Phase 3.1.2" in the two cells "R" and "A."

When the explorer now reaches the cell "A," the treatment circuit releases the hook relay 11 of the test line "A" and writes in the cell "A" the information "Phase 3.1.2.1" with the duration of the cut-off impulse. Each time that the explorer then reaches the cell "A" which contains this information, the treatment circuit deducts one unit from the duration written in the cell "A." When the duration has been deducted up to zero, the treatment circuit returns the hook relay 11 to working position and writes in the cell "A" the information "Phase 3.1.2.2." with the duration of the space of time between two cut-off impulses. Each time that the explorer then reaches the cell "A," the treatment circuit deducts one unit from the duration written in this cell. When the duration has been deducted up to zero, the treatment circuit again releases the hook relay 11 for a second cut-off impulse and writes in the cell "A" the information "Phase 3.1.1.1" and the duration of the cut-off impulse. Each time that the explorer again reaches this cell, it deducts one unit from the duration which is therein written. When the duration has been deducted up to zero, the treatment circuit again actuates the relay 11 and writes in the cell "A" the information "Phase 3.1.1.2" and the duration of the space of time between the last impulse of the digit and the longer cut-off impulse which ought to follow each digit. Each time that the explorer again reaches this cell, it deducts one unit from the duration therein written. When this duration has been deducted up to zero, the treatment circuit again releases the relay 11 and writes in the cell "A" the information "3.1.0.1" and the duration of the long cut-off. Each time that the explorer again reaches this cell, it deducts one unit from the duration which is therein written. When this duration has been deducted up to zero, the treatment circuit makes the relay 11 again operate and writes in the cell "A" the information "Phase 3.1.0.2" with a duration which will be that of a suitable space of time between the sending of two successive digits. Each time that the explorer again reaches this cell, the treatment deducts one unit from the duration which is therein written. When this duration has been deducted up to zero, the treatment circuit at last writes the information "Phase 3.2" to transfer the second digit of the number and so on.

There will now be described the variant shown in FIG. 2. In this variant, the particular test circuits are associated in common with groups of test lines. The number of test lines in such a group can be, for example, 8, but it will be remarked that nothing is opposed to different test circuits being associated with groups comprising lines in different numbers.

On the other hand, the choice of the test lines which will be coupled for test calls is made, in this variant, by means proper to the treatment circuit 31, with an appropriate programme of choice.

Figure 2:
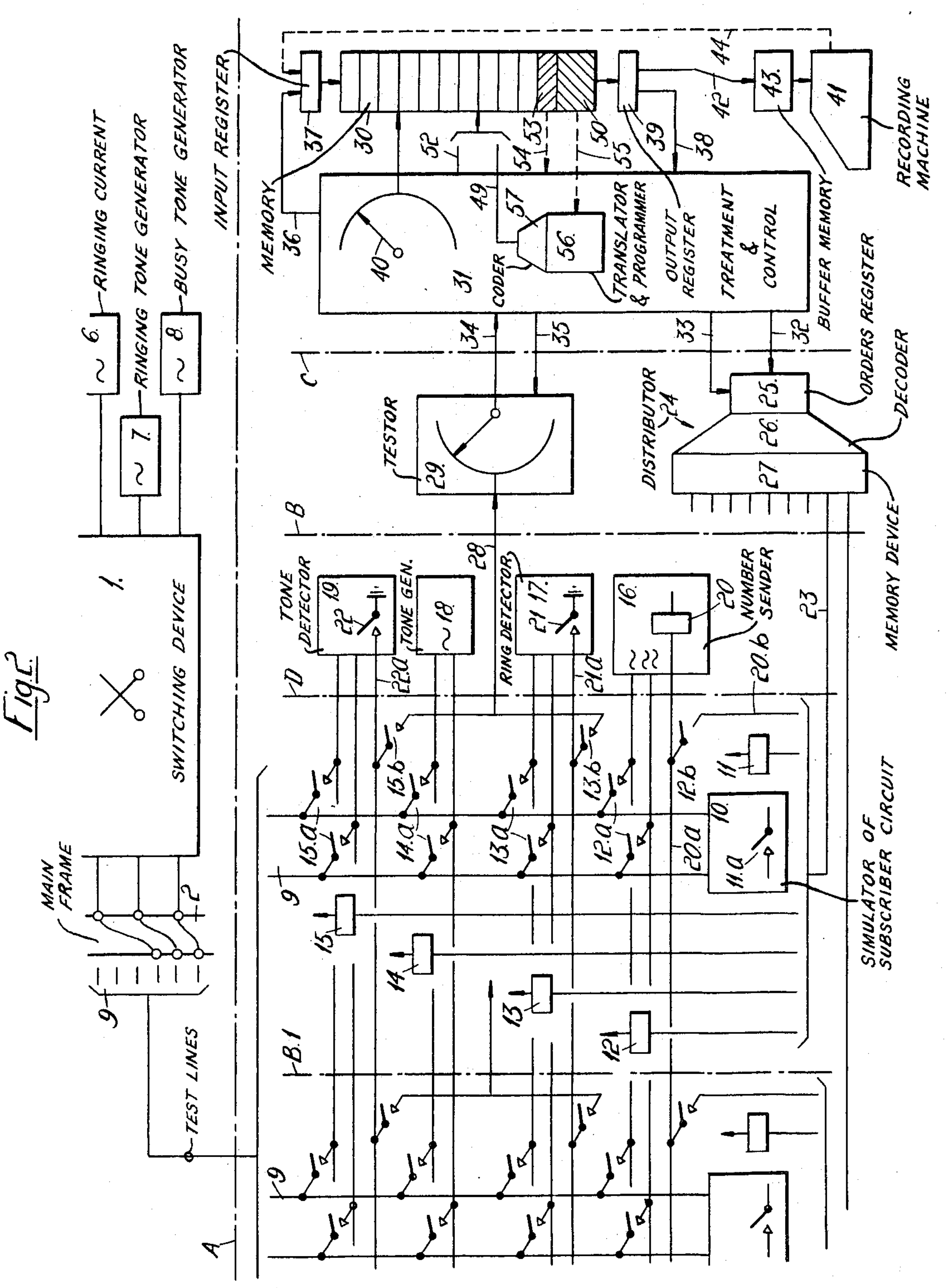
FIG. 2 shows the general schematic of another embodiment exemplary of the invention, comprising test circuits associated with groups of lines and choosing means comprised in the treatment circuit.

The units which have, essentially, the same function as in FIG. 1 are designated by the same reference digits in FIG. 2.

The separate test circuits such as 16, 17, 18 and 19 are then associated with groups of test lines 9. The test circuits shown in FIG. 2 are associated with a same group of test lines and are separated from equipment proper to these lines by the dash-dot line D. The branching wires of these circuits on lines 9 are multiples which are connected to the wires of the test lines by means of contacts **12*a*, 13*a*, 14*a*, 15*a* of connection relays 12, 13, 14, 15. The test wires 21*a*, 22*a* of the detector circuits 17, 19 are multiples which are connected to test wires 28 associated with the test lines by means of contacts 13*b*, 15*b* of the same relays 13, 15. The relay frequency senders 20 which equip the number sender 16 are controlled by means of a multiple 20*a* which is connected to groups of control wires 20*b* associated with the test lines by means of contacts 12*b* of the relay 12. A single test wire 28 is associated with each test line to apply at the input of the tester 29, either marking by the contact 21 in the circuit 17, or marking by the contact 22 in the circuit 19. The test phase does not leave any ambiguity as to the detector circuit which applies its marking to this wire 28**.

The treatment circuit 31 would be able to test the availability of the test circuits, before connecting them to the test lines, by analogical means such as availability wires which would be able to be tested by means of the same tester 29. In the variant shown, the treatment circuit itself marks the test circuits that it connects or disconnects in a points field 53 constituted in a memory cell 30 which is not explored in the cycles of exploration of the cells assigned to the test lines. The treatment circuit refers to this cell 53 each time that such is necessary by means of a connection shown schematically by the line 54.

There is going to be described hereafter the operation of the test device thus constituted in phase 1, 2 and 3 of a test call. That will make sufficiently understood the operation of this device in all the other phases.

PHASE 1 — LOOPING OF THE CALLING LINE (A)

The common test circuits are not concerned in this phase, and the operation is the same as in the variant of FIG. 1. The hook relay 11 is caused to operate in the circuit 10 of the test line "A" and the information "Phase 2" is written in the cell "A."

PHASE 2 — RECEPTION OF THE DIAL TONE

When the explorer again reaches the cell "A" considered, the treatment circuit 31 refers to the points field 53 for the availability of the detector circuit 19. If it finds that the circuit 19 is already connected, it passes without more to the next cell. When it finds that the circuit 19 is disconnected it causes to it to be connected by the relay 15 of the test line "A" and writes the information "Phase 2.1" in the cell "A."

The detection of this tone, which can be shown after a sufficiently long delay, will be made by soundings of 20 mS. (or 5 cycles of exploration) repeated a certain number of times at intervals of 200 mS. Between these soundings the same circuit 19 will be able to be connecte to other test lines.

The treatment then writes in the cell "A," with the phase 2.1, the duration of a sounding and the number of soundings foreseen. This number can be written as an index of the phase. For example, if 20 soundings are foreseen, the information can be "Phase 2.20.1."

Each time that the explorer anew reaches the cell "A,"it deducts one unit from the duration of the sounding and refers to the tester. So long as the tester does not signal the dial tone, the treatment circuit passes without more to the next cell. If the tester signals the tone in the course of this sounding, the treatment circuit causes the detector circuit 19 to be disconnected and writes the information "Phase 3" in the two cells "A" and "R." If the duration of the sounding is counted back to zero without the tester having signalled the tone, the treatment circuit still causes the circuit 19 to be disconnected and writes the information "Phase 2.20.2" in the cell "A" with the duration foreseen between two soundings.

Each time that the explorer again reaches the cell "A," the treatment circuit deducts one unit from this second duration and passes without more to the next cell. When it has deducted this duration up to zero, it refers to the field of points 53 for the availability of the circuit 19. If it finds that this circuit is already connected (to another test line), it passes without more to the next cell. When it finds that the circuit 19 is disconnected, it causes it to be connected to the test line "A" by the relay 15 of this line and writes in the cell "A" the information "Phase 2.19.1" with the duration of a sounding, and so on.

If the tester does not signal the dial tone before the end of the last sounding foreseen (phase 2.1.1) a fault of operation of the exchange ought to be registered. When the tone is signalled in the course of a sounding, the treatment circuit causes the detector circuit 19 to be disconnected and writes the information "Phase 3" in the cell "A."

PHASE 3 — SENDING OF THE WANTED NUMBER

The number sending circuit 16 ought to remain connected to the test line "A" throughout the number sending phase. This phase will then be distinguished from that which has been described for the variant of FIG. 1 only by the test of availability of the common circuit 16 before its connection.

When the explorer again reaches the cell "A," which now contains the information "Phase 3," the treatment circuit refers to the field of points 53 for the availability of the number sending circuit 16. If it finds that this circuit 16 is already connected (to another test line), it passes without more to the next cell. When it finds that the circuit 16 is disconnected, it causes it to be connected by the relay 12 of the test line "A" and writes the information "Phase 3.13" in the two cells "A" and "R."

PHASE 3.1 AND FOLLOWING — TRANSFER AND SENDING OF THE DIGITS

The circuit 16 being connected and the information being written in the two coupled cells, the condition of operation described for FIG. 1 are again found. When the explorer has reached the cell "R," the first digit is transferred to the cell "A" and the information "Phase 3.1.1" is written in the two cells. When the explorer reaches the cell "A," the group of relays 20 is caused to operate and the phase 3.1.2 is written in the cell "A" with the duration of the sending of the frequency combination, etc. When at last the duration of sending of the last digit in the phase 3.*n*.2 has been deducted up to zero, the treatment circuit releases the relays 20 and the connection relay 12, writes the information "Phase 4" in the two cells "A" and "R" and passes to the next cell.

There will now be described the choosing means which are shown in the variant of FIG. 2, while remarking that these means can be used in the variant of FIG. 1 and vice versa. These means are here the numerical means of the calculator 31. The memory cell 50, which is assigned to the choosing operations, here contains a field of points analogous to that of the cell 53 : the calculator marks "free" a point of the field 50 when it frees the corresponding cell, and it marks "busy" when it writes new relation information in this cell.

At the end of each cycle, the explorer 40 reaches the cell 50. The treatment circuit 31 refers to the points fields contained in this cell in order to carry out a choosing programme by means which are indicated schematically by the block 56. For example, the circuit 56 can translate the combinations of free lines into arrangement by two in order to designate successively pairs of coupled lines "A" and "R" so long as there are at least three cells. A coder 57 composes each time the addresses of the two cells designated, and the treatment circuit writes, as in the variant of FIG. 1, the information "A — address R" in the cell which has the address "A," and the information "R — address A" in the cell which has the address "R."

It will be understood that the invention, the principal characteristics of which have been defined above, is not limited to the particulars of the two embodiment examples described with reference to the drawings.

What we claim is:

1. A telephone call simulator for checking the operation of an automatic telephone exchange by simulating subscribers' calls on test lines endowed with directory numbers and connected to the main distributing frame of the exchange in the same manner as subscribers' lines and by verifying the signals by which the operation of the exchange shows itself on these lines, this arrangement comprising:
   - a plurality of test lines,
   - a plurality of separate test circuits, including number senders and generators and detectors of tones associated with the test lines to be connected separately to these lines in successive phases of a test call,
   - a cyclic distributor allowing the connection of these circuits to the successive test lines to be selectively controlled,
   - a cyclic tester allowing the detector circuits which can be connected to the successive test lines to be tested, and
   - a data processing apparatus programmed to supply control signals for said cyclic distributor and said cyclic tester,
   - a direct access electronic memory incorporating a series of cells assigned in fixed manner to the test lines and placed in the same sequence as the test lines, each cell containing the directory number of its line and being able to receive, for each test call, related information such as a calling function A for the calling line or a called function R for the called line, and the address of the cell assigned to the other coupled line in the test call and, in the course of each test call, situation information such as phase of the call and duration of the phase, a cyclic explorer allowing the successive cells of this memory to be explored at the same time as the corresponding test lines are reached by the distributor or the tester, a treatment and control circuit proper for receiving information found in the explored cells and the indications of the tester concerning the corresponding test lines, for sending to the distributor orders for the operation of the appropriate test circuits in connection with these lines and for writing new situation information in the cells explored and in the cells coupled to the explored cells, choosing means allowing different free test lines to be chosen in view of new test calls and appropriate relation information to be written in the corresponding cells, and start means to engage test calls on the lines the cells of which have received the appropriate relation information.

2. A telephone call simulator according to claim 1, in which the said choosing means are enabled to explore the free memory cells and carry out the choosing operations on these calls, without a direct connection being necessary between these means and the test lines themselves.

3. A telephone call simulator according to claim 2, in which the operation of the said choosing means is controlled by a call device, including means operable when the free cells are in a selected number.

4. A telephone call simulator according to claim 2, in which information the said choosing means constitutes a separate circuit, in particular a wired logic circuit, operating on a point field connected to the cells to be distinctively marked by the free cells, and writing the pairs of cells designated for new test calls in a memory cell called "of designation" to which the treatment circuit then refers in order to write the relation information in the designated cells.

5. A telephone call simulator according to claim 2, in which the said choosing means form part of the treatment circuit and are served by means of appropriate information concerning the free cells, the pairs of cells designated for new test calls being written in a memory cell called "of designation" to which the treatment circuit then refers to write the relation information in the designated cells.

6. A telephone call simulator according to claim 5, in which the said information means are constituted by a points field marked by the treatment circuit itself when this circuit frees the cells after test calls.

7. A telephone call simulator according to claim 4, in which the said designation cell forms part of the same memory as the cells assigned to the test lines that its exploration forms part of the cycle of exploration of this memory and the relation information is transferred from this designation cell to the cells designated when the exploration reaches this designation cell.

8. A telephone call simulator according to claim 1, in which the said start means are operated by start information which is written in the cells designated for new test calls with the corresponding relation information, in such a way that new test calls are engaged on the chosen test lines as soon as the corresponding calls are reached by the exploration after the writing of new relation information in these cells.

9. A telephone call simulator according to claim 1, in which separate test circuits are associated in common with groups of test lines to be connected to each line in the appropriate phase of a test call, and these circuits are associated with busy marking means to which the treatment circuit refers before controlling the connection of these circuits to the test lines.

10. A telephone call simulator according to claim 9, in which the said busy marking means are constituted by a points field marked by the treatment circuit itself when this circuit connects the said test circuits to the test lines.

11. A telephone call simulator according to claim 9, in which for the verification of a signal which can imply a relatively long waiting duration, means are provided to connect the corresponding detector circuit with several resumptions each time for a sounding of a limited duration, at intervals several times longer than the duration of each sounding, in such a manner that the same detector circuit can be connected between times to the test line of the group in the manner of a time division multiplex.

12. A telephone call simulator according to claim 11, in which the treatment circuit and the memory cells comprise means which allow at each passage of the exploration on the cell considered, to refer to the tester during each sounding while completing the duration of the sounding, to count the duration of the intervals between the soundings without referring to the tester and to count the number of successive soundings.

* * * * *